(12) United States Patent
Nakai et al.

(10) Patent No.: US 7,011,510 B2
(45) Date of Patent: Mar. 14, 2006

(54) HOT ISOSTATIC PRESSING APPARATUS AND HOT ISOSTATIC PRESSING METHOD

(75) Inventors: Tomomitsu Nakai, Takasago (JP); Makoto Yoneda, Takasago (JP); Shigeo Kofune, Takasago (JP); Takao Fujikawa, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 267 days.

(21) Appl. No.: 10/388,665

(22) Filed: Mar. 17, 2003

(65) Prior Publication Data

US 2003/0197295 A1 Oct. 23, 2003

(30) Foreign Application Priority Data

Mar. 28, 2002 (JP) .............................. 2002-092061

(51) Int. Cl.
*B29C 43/10* (2006.01)
*B22F 3/15* (2006.01)

(52) U.S. Cl. .................. 425/78; 425/170; 425/405.1; 425/815; 432/199; 219/400

(58) Field of Classification Search ............ 425/405.1, 425/170, 78, 210, 815, 405.2; 432/199; 219/400
See application file for complete search history.

(56) References Cited

U.S. PATENT DOCUMENTS

| 3,606,286 A | | 9/1971 | Lundstrom | |
|---|---|---|---|---|
| 4,217,087 A | * | 8/1980 | Bowles | 425/78 |
| 4,532,984 A | | 8/1985 | Smith | |
| 4,756,680 A | * | 7/1988 | Ishii | 425/78 |
| 4,830,342 A | * | 5/1989 | Boneff | 425/405.2 |
| 6,250,907 B1 | * | 6/2001 | Bergman | 425/405.2 |

FOREIGN PATENT DOCUMENTS

| JP | 3-34638 | 7/1991 |
|---|---|---|
| JP | 6-11268 | 1/1994 |

* cited by examiner

*Primary Examiner*—Robert Davis
*Assistant Examiner*—Thu Khanh T. Nguyen
(74) *Attorney, Agent, or Firm*—Oblon, Spivak, McClelland, Maier & Neustadt, P.C.

(57) ABSTRACT

A hot isostatic pressing apparatus (HIP apparatus) comprises a vertically cylindrical high-pressure vessel comprising a high-pressure cylinder 1 and upper and lower lids 2 and 3; a bottomed cylindrical casing 6 capable of housing workpieces 9 and a resistance-wire heater 11, a heat insulating structure 16 equipped with a gas flow regulating valve 15 and formed in a bottomed cylindrical shape on the outside of the casing 6 so as to cover the casing 6, and a heat sink 17 having a water cooling mechanism provided in the space defined by the heat insulating structure 16 and the inner surface of the high-pressure cylinder 1, which are provided within the high-pressure vessel; and a pressure medium gas stirring fan 12 for promoting the temperature uniformity of the space of the treatment chamber 7 for housing the workpieces 9, the stirring fan being arranged on the lower lid 3 side within the casing 6, whereby the cooling to a temperature range of 100° C. or lower which allows a quenching treatment and the safe manual handling of workpieces can be efficiently performed.

8 Claims, 8 Drawing Sheets

PRIOR ART

FIG.8  PRIOR ART

HOT ISOSTATIC PRESSING APPARATUS AND HOT ISOSTATIC PRESSING METHOD

BACKGROUND OF THE INVENTION

1. Field of the Invention

The present invention relates to a hot isostatic pressing apparatus and a hot isostatic pressing method.

2. Description of the Related Art and Problems to be Solved by the Invention As a technique for eliminating residual pores in casting products or in sintered products such as ceramics by performing a heat-up under a high-pressure gas atmosphere of several tens to several hundreds MPa, hot isostatic pressing (HIP) has been extensively used in industrial fields with confirmation of effects such as improvement in mechanical characteristic, reduction in scatter of properties, and improvement in yield.

A conventional HIP apparatus used for the purpose as described above has, as shown in FIG. 7, a structure containing a so-called resistance-wire heating electric furnace, in which a bottomed cylindrical heat insulating structure 44 and a resistance-wire heater 45 arranged along the inner surface of the heat insulating structure 44 are provided within a vertically cylindrical high-pressure vessel comprising a high-pressure cylinder 41 and upper and lower lid 42 and 43. The upper lid 42 comprises a high-pressure gas inlet port 46, and the lower lid 43 is formed of a ring-like lid 47 and a plug-like lid 48 on the inside thereof. At the time of operation, a workpiece housing case 50 containing workpieces 49 is placed on the plug-like lid 48 through a workpiece base 51, and charged into a treatment chamber 52 on the inside of the resistance-wire heater 54. Since such an apparatus is operated under rather high pressure, the load of internal pressure acting on the upper and lower lids 42 and 43 reaches up to 8000 tons in the operation of such a large apparatus as to have an inside diameter of 1 m at 100 MPa. Therefore, the upper and lower lids 42 and 43 are supported by window-frame shaped steel frames (not shown) in order to support this load.

Figure 7:
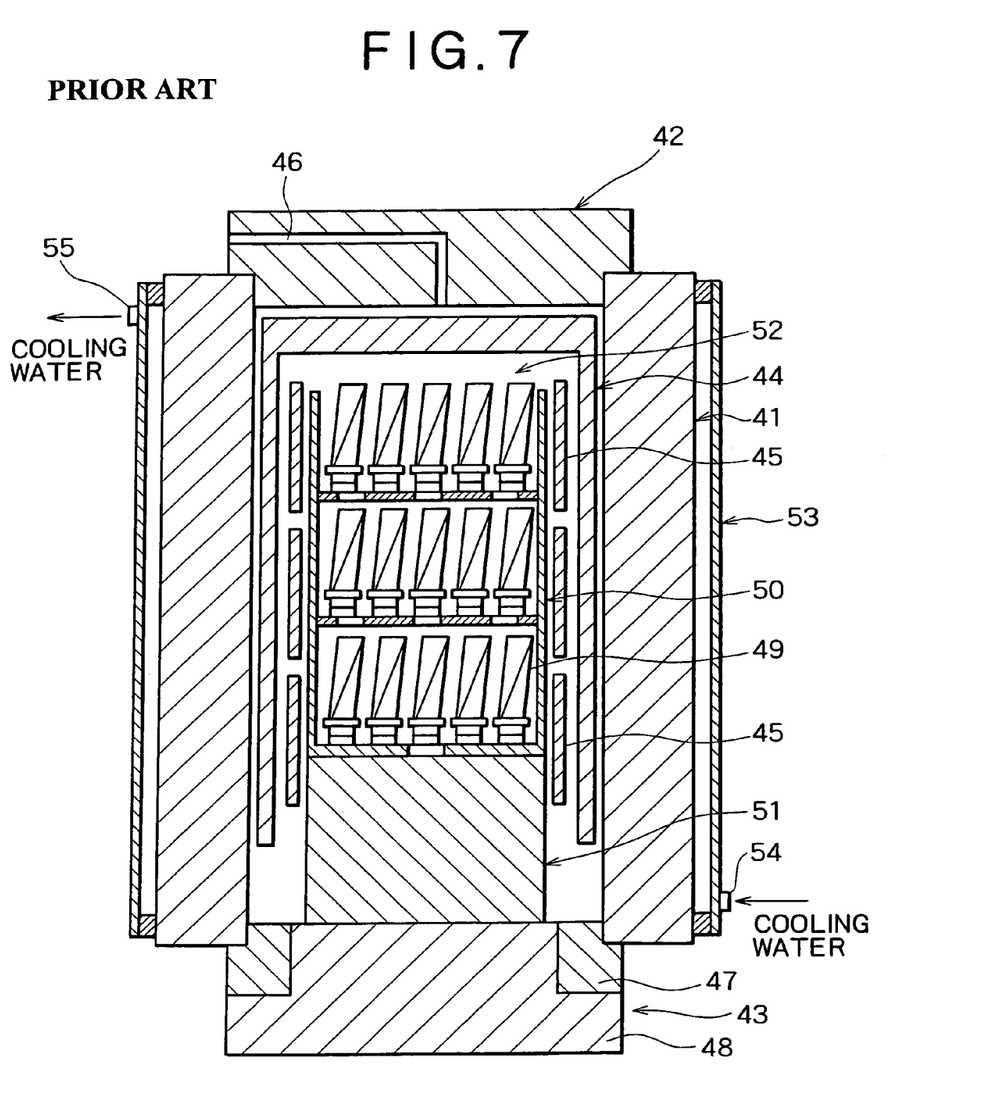
FIG. 7 is a schematic sectional view of a conventional HIP apparatus.

The resistance-wire heater 45 is vertically divided and arranged in two or more stages so as to surround the treatment chamber 52 in the high-pressure vessel. This is a measure to ensure the vertical temperature uniformity in the treatment chamber 52 because the violent natural convection of the high-pressure gas is apt to cause in the treatment chamber 52 a temperature distribution that the upper part has a high temperature and the lower part has a low temperature. Further, the natural convection of the gas also causes the excessive dissipation of the heat for heating the treatment chamber 52. In order to efficiently suppress it, therefore, the structure of surrounding the treatment chamber 52 and the heater 45 with the bottomed cylindrical heat insulating structure 44 is adapted. The heat transmitted to the high-pressure cylinder 41 of the high-pressure vessel through the heat insulating structure 44 is removed by the cooling water running in a water cooling jacket part 53 on the circumference thereof. Denoted at 54 and 55 are cooling water inlet port and outlet port, respectively.

Figure 8:
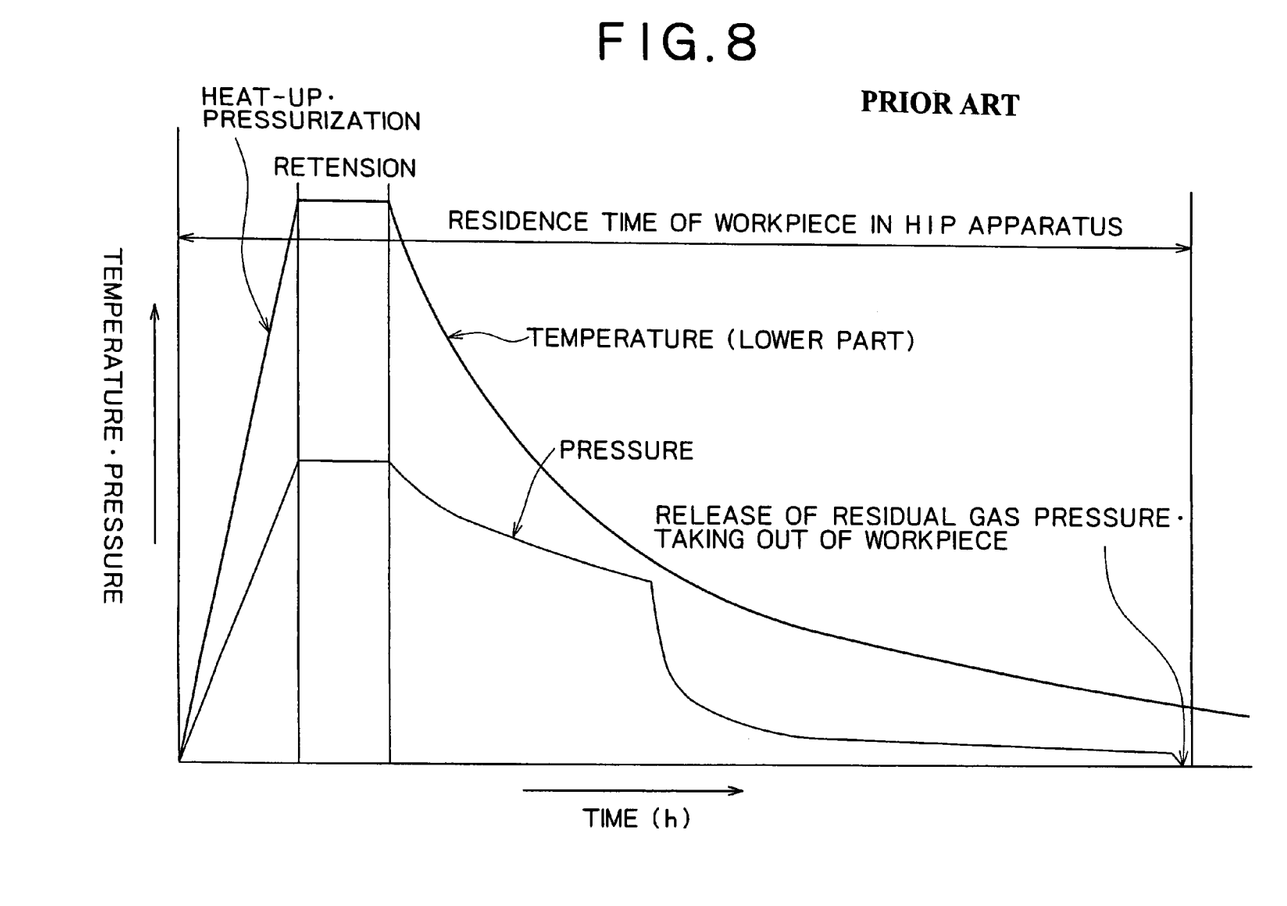
FIG. 8 is a schematic graph showing the change in internal temperature and pressure with the lapse of time in the conventional HIP apparatus shown in FIG. 7.

The operation for temperature and pressure in the conventional HIP method as described above comprises processes of heat-up and pressurization; temperature and pressure retaining; and temperature reduction (cooling) and pressure reduction, as shown in FIG. 8, after the evacuation and gas substitution for discharging the internal air of the HIP apparatus prior to treatment. As is apparent from FIG. 8, the long overall treatment time, particularly, the long residence time of workpieces in the expensive high-pressure vessel results in an increase in treatment cost, and a reduction in the cycle time has been thus a serious subject in industrial productions. In order to improve this, particularly, the long time occupied by the cooling process, namely the slow cooling rate, research and development have been carried out with respect to a so-called rapid cooling technique for HIP method.

In a cooling method by use of natural convection, which was proposed at the beginning, the cooling rate falls as the temperature difference between the treatment chamber part and the space just inside of the inner surface of the high-pressure vessel becomes smaller. Therefore, in order to improve it, it was proposed to place a fan or a pump inside the high-pressure vessel to generate a forced convection in addition to the natural convection (e.g., a HIP apparatus proposed in Japanese Utility Model Publication No. 3-34638). However, since even the method for generating the forced convection by use of the fan or pump to improve the cooling rate adapted the type of performing a heat exchange between a circulating gas forcedly circulated in a heat insulating layer and a circulating gas forcedly circulated in a furnace chamber, a large temperature distribution with a high temperature in the upper side and a low temperature in the lower side still occurred in the inner part of the furnace chamber (treatment chamber) although an improvement in cooling rate was recognized up to a certain temperature range. Consequently, the problem that the thermal histories of workpieces in the treatment chamber are varied depending on places became to be recognized.

In an HIP apparatus structure proposed in U.S. Pat. No. 4,532,984, since the gas forcedly circulated by a pump or fan is alternately carried in the respective inside and outside spaces of a heat insulating hood and an inner cylindrical liner, and a heat exchanger comprising a coiled tube is set adjacently to the pump, the cooling rate can be enhanced more than in the HIP apparatus structure proposed in the above Japanese Utility Model Publication No. 3-34638. However, an uniform circulating gas flow cannot be obtained because the pump for forcedly circulating the gas in the inside and outside spaces of the heat insulating hood is positioned closer to one side of a lower lid. Further, uniform cooling of the circulating gas cannot be expected because the heat exchanger is also shifted in conformation to the setting position of the pump. Therefore, the problem that the thermal histories of the workpieces in the treatment chamber are varied depending on places is supposed.

By using the method for improving the cooling rate as proposed in each patent publication described above, the retaining temperature, for example, the cooling rate from 1200° C. to about 300° C. could be significantly improved. On the other hand, it is preferable to cool the workpieces to 100° C. or lower when taking out and handling the workpieces from the viewpoint of operator's safety such as prevention of a disaster by burn. However, the limitation of temperature (substantially a surface temperature of 100 to 150° C.) in the high-pressure vessel as heat sink (temperature lowering device) still remains even with the above method, and it is the actual condition that a sufficient function cannot be necessarily provided in the point of cooling to 100° C. or lower.

In recent years, further, there has been proposed the idea of performing quenching simultaneously with HIP treatment, and a super-rapid cooling and the temperature uniformity in the treatment chamber inner part is required for this. To meet the requirements, a heat sink for releasing the heat possessed by the treatment chamber including the workpieces and the heat insulating structure in a short time is required, which has developed the recognition that a sufficient heat extraction effect cannot be obtained only with the conventional thought of using the high-pressure vessel itself as the heat sink. Particularly, in such a large HIP apparatus as to have a treatment chamber diameter exceeding 1 m, such a requirement is increasingly enhanced.

SUMMARY OF THE INVENTION

The present invention has been achieved to solve the problems of conventional techniques as described above. Namely, the present invention has an object to provide a hot isostatic pressing apparatus (HIP apparatus) and hot isostatic pressing method (HIP method) capable of efficiently cooling workpieces to a temperature range of 100° C. or lower which allows a quenching treatment and safe manual handling of workpieces.

The present invention thus provides a hot isostatic pressing apparatus comprising:

a high-pressure vessel;

a heater provided within the high-pressure vessel;

a bottomed cylindrical casing being provided within the high-pressure vessel, the bottomed cylindrical casing comprising a treatment chamber for treating workpieces to be treated formed in the inner part, and being capable of housing the heater;

a bottomed cylindrical heat insulating structure provided within the high-pressure vessel, the heat insulating structure being provided on the outside of the casing so as to cover the casing;

a gas flow regulating valve provided on the casing;

a heat sink having a water cooling mechanism, the heat sink being provided in a space defined by the temperature uniformity structure and the inner surface of the high-pressure vessel; and a pressure medium gas stirring fan, the fan being arranged within the casing to promote the temperature uniformity in the treatment chamber space for housing workpieces.

In the above structure, the casing is set on the inside of the heat insulating structure, and the treatment chamber is defined on the inside of the casing, whereby the internal gas flow and external gas flow of the treatment chamber are discriminatively heat-exchanged. The gas flow regulating valve is provided on the heat insulating structure, and the valve is opened, whereby the space defined by the heat insulating structure and the inner surface of the high pressure vessel is allowed to communicate with the outside of the treatment chamber to circulate the gas on the inside and outside of the heat insulating structure. The heat sink (temperature lowering device) having the water cooling mechanism is provided in the space defined by the heat insulating structure and the inner surface of the high pressure vessel, whereby the gas circulated in the space is efficiently and uniformly cooled. The pressure medium gas-stirring fan is set on the lower side within the casing, and the pressure medium gas within the treatment chamber space for housing workpieces is stirred by the fan to promote the temperature uniformity.

According to the above structure, thus, in cooling after HIP treatment, on the outside of the casing, the pressure medium gas forcedly cooled by the heat sink in the space defined by the heat insulating structure and the inner surface of the high pressure vessel is descended, and the pressure medium gas subjected to heat exchange through the casing is heated up and ascended in the space between the casing and the heat insulating structure, whereby a rapid cooling is performed simultaneously with the circulation of the pressure medium gas. Within the casing, the pressure medium gas in the treatment chamber space for housing workpieces is stirred by the pressure medium gas stirring fan to promote the temperature uniformity, and also heat-exchanged through the casing to perform a rapid cooling, whereby the cooling of the casing and the heat insulating structure as well as the workpieces and the treatment chamber inner part can be efficiently performed.

In the hot isostatic pressing apparatus of the above structure, further, a circulating flow promoting fan for controlling the convection of gas in the space defined by the inner surface of the heat sink and the outer surface of the heat insulating structure to improve the cooling rate may be arranged on the inside of the heat sink and the outside of the heat insulating structure. By arranging such a circulating flow promoting fan, the pressure medium gas on the outside of the casing is further forcedly circulated in addition to the forced circulation by the cooling by the heat sink, and the above effect can be more enhanced.

In the hot isostatic pressing apparatus of the above structure, the heat sink arranged in the space between the heat insulating structure and the high-pressure vessel may have a structure in which a number of metallic pressure resisting pipes are arranged and connected to a header member for distributing the flow of cooling water. By using such a heat sink, the pressure medium gas on the outside of the casing is further forcedly circulated in addition to the forced circulation by cooling by the heat sink, and the above effect can be more enhanced. The cooling rate can be significantly improved in the combined use with the circulating flow promoting fan.

The hot isostatic pressing apparatus of the above structure may comprise a water cooling mechanism provided so as to make contact with the outer surface of the high-pressure vessel. By providing such a water cooling mechanism, the high-pressure vessel also exhibits the function as a heat sink, and the above effect can be more enhanced.

The hot isostatic pressing apparatus of the above structure may further comprise temperature sensors provided on the upper part and lower parts of the treatment chamber.

The hot isostatic pressing method of the present invention for performing a hot isostatic pressing treatment by use of the hot isostatic pressing apparatus comprising the temperature sensors in the upper and lower parts of the treatment chamber comprises controlling the gas flow regulating valve so that the pressure medium gas is circulated in the high-pressure vessel to promote the cooling in the cooling procedure after high-temperature and high-pressure retention procedure; and controlling the gas circulating flow rate of the pressure medium gas stirring fan according to the difference between the temperature value of the treatment chamber upper part and the temperature value of the treatment chamber lower part to ensure the temperature uniformity in the cooling process. According to this, in the cooling after temperature and pressure retention procedure, an efficient cooling treatment can be performed while ensuring the cooling rate and the temperature uniformity.

The hot isostatic pressing method of the present invention for performing a hot isostatic pressing method by use of the hot isostatic pressing apparatus comprising temperature sensors in the upper and lower parts of the treatment chamber comprises controlling the gas flow regulating valve so that the pressure medium gas is circulated in the high-pressure vessel to promote the cooling in the cooling process after high-temperature and high-pressure retention; controlling the gas circulating flow rate of the pressure medium gas stirring fan according to the difference between the temperature value of the treatment chamber upper part and the temperature value of the treatment chamber lower part to ensure the temperature uniformity in the cooling procedure; and driving the circulating flow promoting fan in the temperature range of a prescribed temperature or lower to further improve the cooling rate in this temperature range. According to this, a rapid cooling can be carried out while retaining excellent temperature uniformity up to a low temperature area in the cooling after HIP treatment.

As described above, according to the present invention, the problems in the conventional HIP treatment: (1) the long treatment cycle time, particularly, cooling time, and (2) generation of the temperature distribution between the upper and lower parts in the treatment chamber in cooling process can be solved, and the workpieces can be taken out from the HIP apparatus in a short time. Consequently, a significant reduction in cost of HIP treatment can be expected, which allows the expansion of applicable field of HIP method in industrial productions such as the application to many aluminum alloy casting products to which the HIP treatment could not be applied in the past because of the barrier of high HIP treatment cost in spite of the recognition of the technical advantage of the HIP treatment. This is extremely contributable to industrial development.

DESCRIPTION OF THE PREFERRED EMBODIMENTS

The present invention will further be described in detail in reference to the drawings of preferred embodiments of the present invention.

Figure 1:
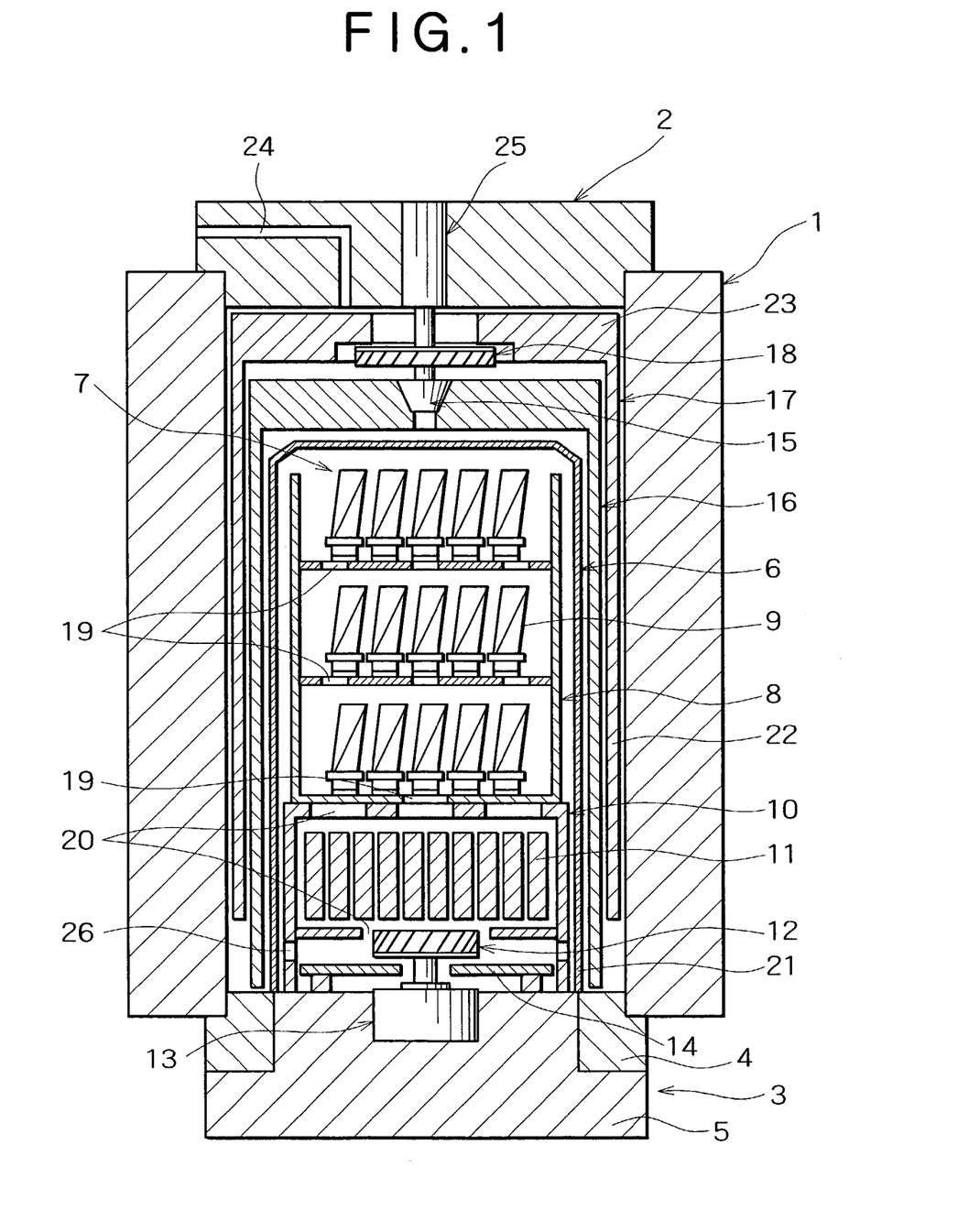
FIG. 1 is a schematic sectional view showing a HIP apparatus according to the present invention.

FIG. 1 is a schematic sectional view of a HIP apparatus according to the present invention. A bottomed cylindrical casing 6 (reversed tumbler-shape casing) is arranged on the inside of a high-pressure vessel comprising a high-pressure cylinder 1, an upper lid 2 and a lower lid 3, and a treatment chamber 7 is formed in the inner part thereof. A workpiece case 8 having a hole 19 formed so as to facilitate the flowing of a gas is arranged in the treatment chamber 7, and workpieces 9 are arranged therein. The workpiece case 8 is placed on a workpiece base 10 having holes 20 for passing the gas. A heater 11, a pressure medium gas stirring fan 12, and a heat insulating plate 14 for cutting off the transfer of heat to a motor 13 for driving the pressure medium gas stirring fan 12 are housed in the workpiece base 10.

The casing 6 comprises a pressure equalizing hole 21 on the lower end part, and a bottomed cylindrical heat insulating structure 16 having a gas flow regulating valve 15 for promoting cooling arranged in the upper part is arranged on the outside thereof. A heat sink 17 comprising a water cooling mechanism is arranged in the space between the heat insulating structure 16 and the high-pressure cylinder 1. The connection part with the upper lid 2 of the upper part of the heat sink 17 forms a header 23 for distributing cooling water to a cylindrical part 22. A circulating flow promoting fan 18 can be arranged, if necessary, in the space between the header 23 and the upper surface of the heat insulating structure 16. When it is arranged, the cooling rate in a low temperature area (e.g., 500° C. or lower) can be improved more in the cooling process after HIP treatment.

The lower lid 3 is formed of a ring-like lid 4 and a plug-like lid 5 on the inside thereof. In this embodiment, the pressure medium gas stirring fan 12 is provided so as to be buried in the plug-like lid 5, and the taking-in and -out of the workpieces 9, the workpiece case 8 and the workpiece base 10 is performed by raising and lowering only the plug-like lid 5. The casing 6 and the heat insulating structure 16 are placed on the ring-like lid 4. The heat sink 17 is formed of the header 23 and the cylindrical part 22, and retained in the form where it is suspended from the upper lid 2 with the header 23 upward. Denoted at 24 is an inlet port for a high-pressure gas of pressure medium formed in the upper lid 3, 25 is a drive mechanism part for the gas flow regulating valve 15 and the circulating flow promoting fan 18, which is provided on the upper lid 3, and 26 is a gas passing hole formed in the lower part of the workpiece base 10.

The HIP treatment by use of the HIP device having the above structure is then described.

Figure 2:
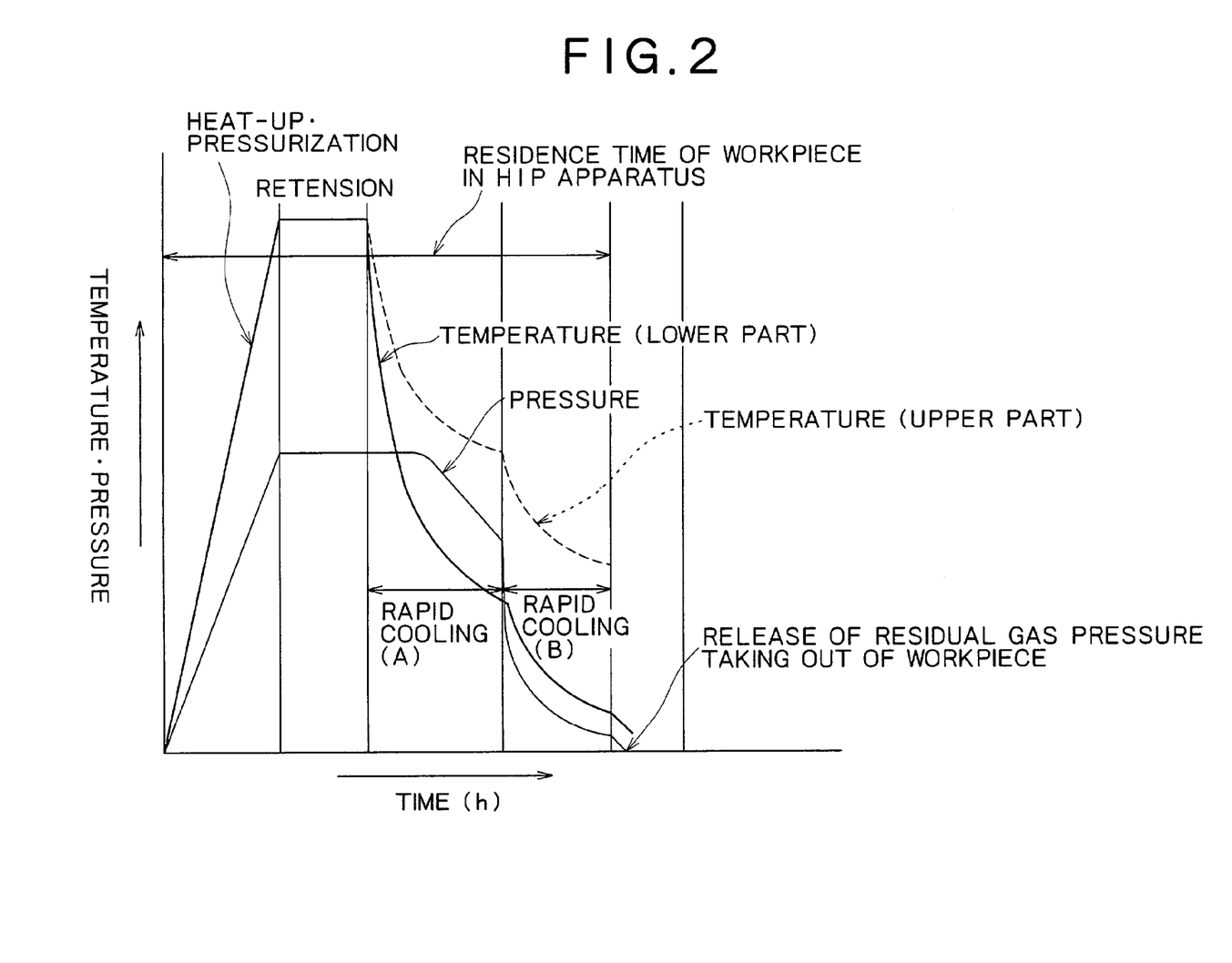
FIG. 2 is a schematic graph as comparative example showing the change in internal temperature and pressure with the lapse of time when using no pressure medium gas stirring fan in the HIP apparatus according to the present invention.

FIG. 2 is a graph schematically showing, as a comparison, the cooling rates of the upper part and lower parts in the treatment chamber 7 when performing a rapid cooling by use of the heat sink 17 and the gas flow regulating valve 15 without using the pressure medium gas stirring fan 12 that is essential in the present invention. When the pressure medium gas stirring fan 12 is not used as in this example, the lower part of the treatment chamber 7 is rapidly cooled because the cooled gas descends, while the upper part remains in a rather high-temperature state. Such a vertical temperature distribution has the problem that the taking-out of the HIP-treated workpieces 9 cannot be performed until the upper temperature sufficiently drops, and the effect of substantially shortening the treatment time cannot be thus obtained. Further, from the viewpoint of heat treatment, it results in the different thermal histories of the workpieces 9 between the upper part and the lower part within the treatment chamber 7, causing a problem in management of quality. In the drawing, rapid cooling (A) refers to a cooling by use of the forced convection of the high-pressure gas, and cooling (B) refers to the cooling by the adiabatic expansion of the gas when releasing the high-pressure gas out of the high-pressure vessel to reduce the pressure.

Figure 3:
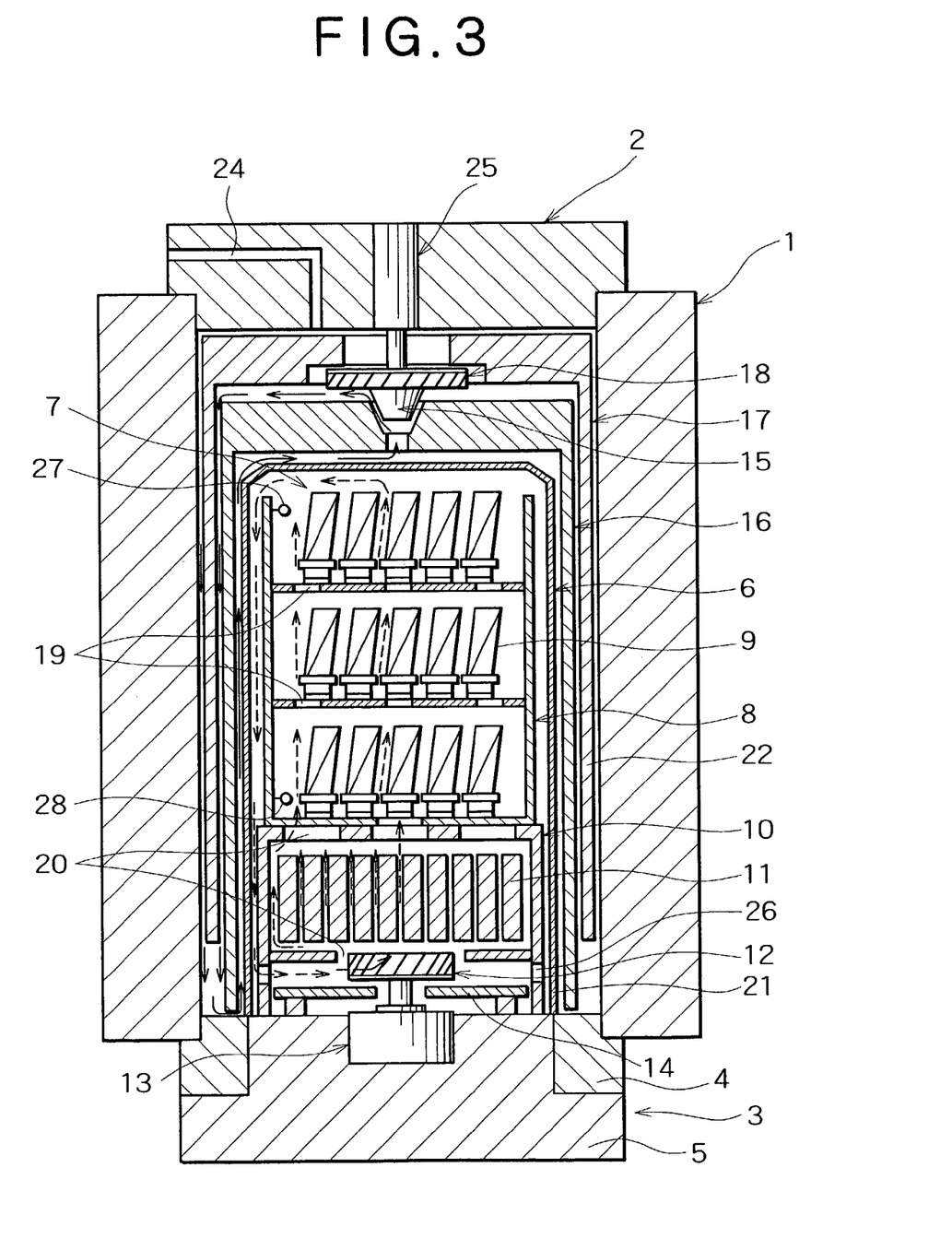
FIG. 3 is a schematic sectional view of the HIP apparatus according to the present invention including the flow of a pressure medium gas in cooling.

On the contrary, according to the present invention using the pressure medium gas stirring fan 12, such a problem is not caused. Namely, the flow of the pressure medium gas within the pressure vessel is as shown in FIG. 3 in the present invention. On the outside of the casing 6, the gas flow regulating valve 15 is opened, whereby the gas is cooled by the heat sink 17 to generate a descending flow in the space defined by the heat insulating structure 16 and the high-pressure cylinder 1 similarly to the above comparative example, and the gas is heated up by the heat exchange through the casing 6 to generate an ascending flow in the space defined by the heat insulating structure 16 and the casing 6. These are combined together to form a circulating flow shown by the actual line in FIG. 3. In addition to the same circulating flow as in the comparative example, on the inside of the casing 6, an ascending flow accompanied by stirring is generated in the workpiece case 8 containing the workpieces 9 and in the workpiece base 10 containing the heater 11 by the pressure medium gas stirring fan 12, and a descending flow following the inner surface of the casing 6 is generated between the workpiece case 8 and workpiece base 10 and the casing 6. These are combined together to form a forced circulating flow by the pressure medium gas stirring fan 12 shown by the broken line arrow in FIG. 3.

Figure 4:
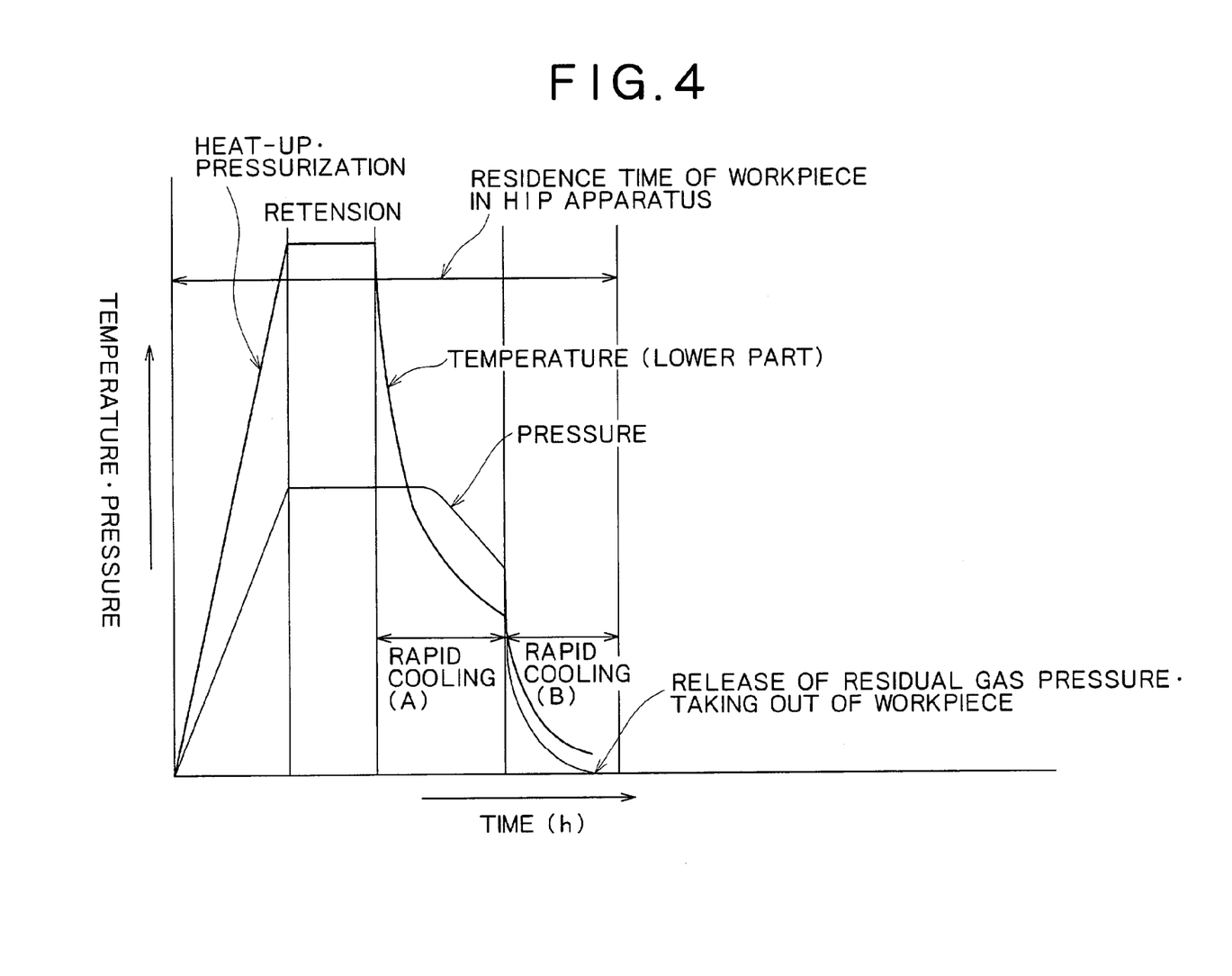
FIG. 4 is a schematic graph showing the change in internal temperature and pressure with the lapse of time in the HIP apparatus according to the present invention.

FIG. 4 is a graph schematically showing the cooling rates of the upper part and lower part in the treatment chamber 7 when using the pressure medium gas stirring fan 12 that is essential in the present invention. As is apparent from FIG. 4, the use of the pressure medium gas stirring fan 12 actively promotes the heat exchange of the pressure medium gas on the inside of the casing 6 through the casing 6, and the temperature uniformity can be attained simultaneously with rapid cooling. In the drawing, rapid cooling (A) refers to a cooling by use of the forced convection of the high pressure gas, and rapid cooling (B) refers to the cooling by the adiabatic expansion of the gas when releasing the high pressure gas out of the high-pressure vessel to reduce the pressure.

The cooling of the casing 6 and the heat insulating structure 16 as well as the workpieces 9 and the inside of the treatment chamber 7 can be efficiently carried out by the outside circulating flow and inside circulating flow of the casing 6, whereby the cooling can be efficiently performed to a temperature range of 100° C. or lower which allows the quenching treatment and the safe manual handling of workpieces.

With respect to the temperature uniformity in cooling, as shown in FIG. 3, temperature sensors 27 and 28 such as thermocouples are set in the upper and lower parts of the treatment chamber 7, respectively, and the gas circulating quantity of the pressure medium gas stirring fan 12 (the rotating speed of the fan) is controlled so that the temperature indication value of the difference of the temperature sensors 27 and 28 is a prescribed value, e.g., ±5° C.

With respect to the cooling rate, when the circulating flow promoting fan 18 is not provided, the circulating quantity of gas by the inside and outside natural convections of the heat insulating chamber 16 is controlled by the ON/OFF opening and closing or opening control of the gas flow regulating valve 15. When the circulating flow promoting fan 18 is provided, it is preferable to control the cooling rate by the ON/OFF opening and closing or opening control of the gas flow regulating valve 15 when the internal temperature of the treatment chamber 7 is as high as 700 to 800° C., or to drive the circulating flow promoting fan 18 when a sufficient cooling rate cannot be obtained even if the valve 15 is substantially fully opened, namely when the temperature reaches a temperature range of 500° C. or lower. According to this, since the outside circulating flow and inside forced circulating flow of the casing 6 described above can be more efficiently circulated, not only the workpieces 9 and the inside of the treatment chamber 7 but also the casing 6 and the heat insulating structure 16 can be efficiently cooled, and the cooling to a temperature of 100° C. or lower which allows the quenching treatment or the safe manual handling of the workpieces can be efficiently performed.

For example, in HIP treatment of an aluminum alloy casting product, the treatment temperature and pressure are set to 450 to 530° C. and 100 MPa, respectively, and the retention time is set to 1 to 3 hours although it is varied depending on the size of workpieces. When the workpieces are taken out from the HIP apparatus and handled after retention, preferably, it is recommended to perform the cooling to 100° C. or lower. In the past, it took 5 to 20 hours in a conventional HIP apparatus having a treatment chamber diameter of 30 mm or more to reduce the temperature to 100° C. or lower although it is varied depending on the size of apparatus and the quantity of workpieces. On the contrary, according to the present invention, the taking-out and handling of the workpieces at a temperature of 100° C. or lower can be sufficiently performed with a cooling and pressure reducing time of 1 to 2 hours.

In the HIP apparatus of the above example, a heat sink 17 having a large heat transfer area and a large heat absorbing capacity is required for the exhibition of the cooling rate to the fullest. In the present invention, therefore, the heat sink 17 is arranged within a position close to a heat source, namely within the high-pressure vessel, and in order to a large surface area or heat transfer area, a water cooling structure (heat exchanger) made of metal (or a material having a sufficient strength and a large heat conductivity) equipped with a water channel extended to the inside space of the high-pressure cylinder is employed. A specific example of the heat sink 17 is shown in FIG. 5.

Figure 5:
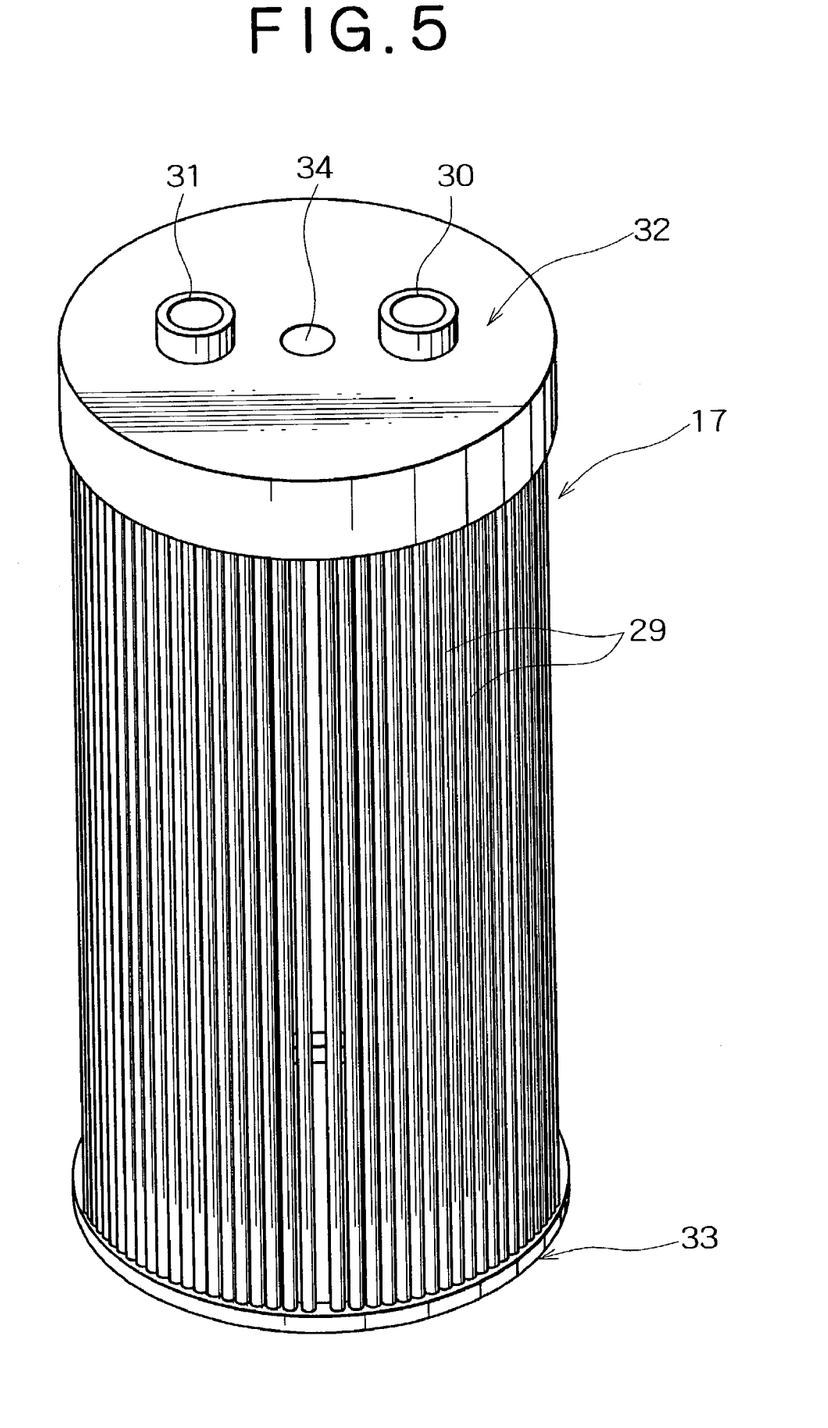
FIG. 5 is a perspective view of a heat sink according to the present invention.

The heat sink 17 shown in FIG. 5 comprises a number of metal pipes 29 provided between a disc-like upper header 32 and a ring-like lower header 33. The upper header 32 comprises an inlet port 30 and outlet port 31 for cooling water on the upper surface and a hole 34 for inserting the valve driving shaft of the gas flow regulating valve 15 formed in the center so as to vertically extend through. One-side ends and other side ends of the metal pipes 29 are connected to the peripheral part of the upper header 32 and the lower header 33 by welding, respectively, to form water channels heading downward from the inlet port 30 and a water channel heading again upward to the drain port 31 with adjacent pipes or two or more pipes each as a unit. According to such a structure, the cooling water introduced from the outside of the high-pressure vessel is carried down in the metal pipe 29 through the inlet port 30, passed in the lower header 33, raised in the adjacent metal pipe 29, and discharged out of the high-pressure vessel through the outlet port.

As described above, the cylindrical part 22 of the heat sink 17 is formed by use of the metal pipes 29, whereby the heat transfer area can be increased, for example, 1.5 to 3 times, compared with the cylindrical part 22 comprising water channels constituted by simply partitioning an inside and outside double cylindrical body, and the cooling efficiency can be thus enhanced.

Figure 6:
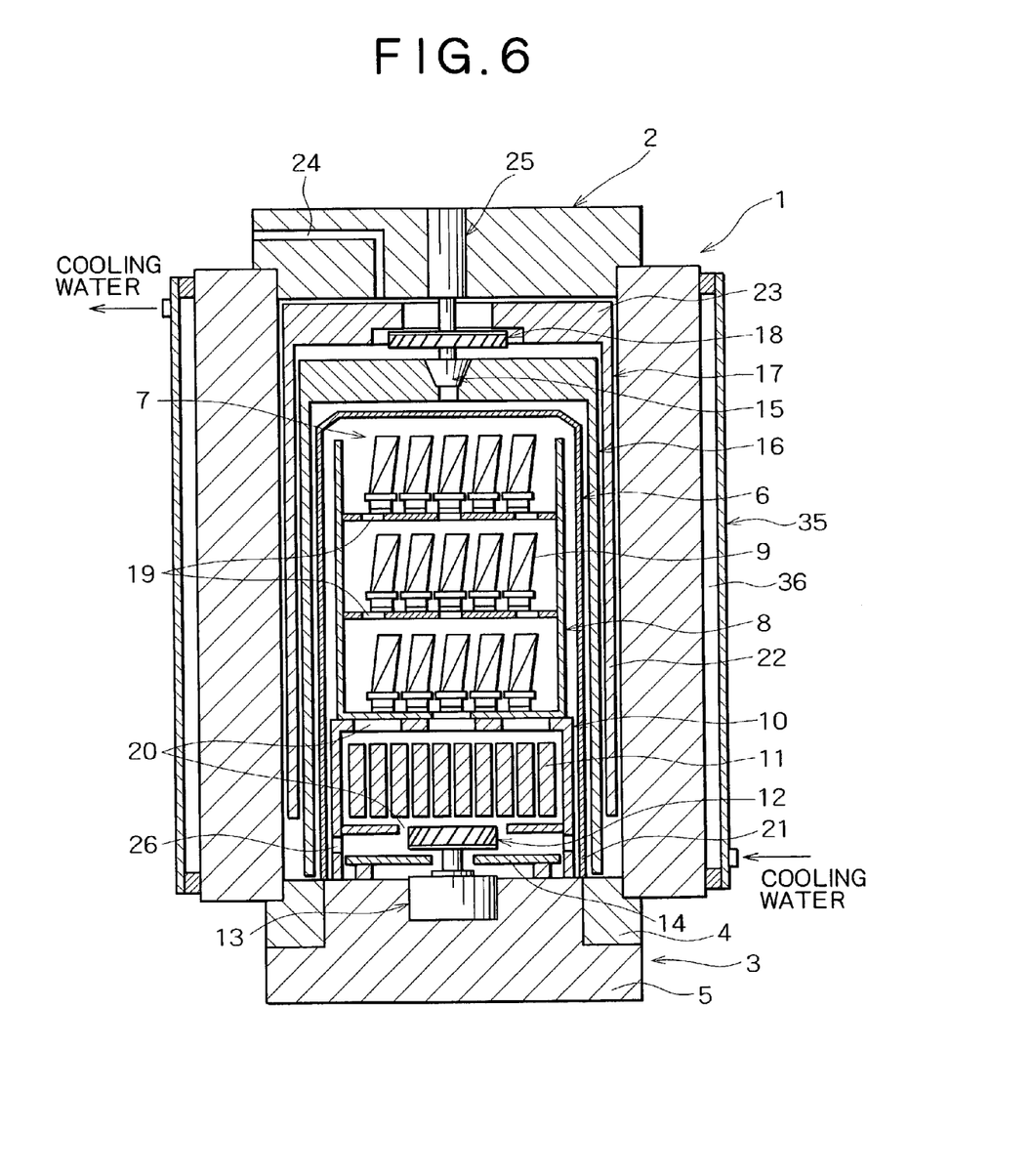
FIG. 6 is a schematic sectional view of another HIP apparatus according to the present invention.

From the viewpoint of heat transfer area, since the high-pressure cylinder 1 of the high-pressure vessel and the inner surface of the upper lid 2 can effectively work as radiating members similarly to those in the conventional HIP apparatus, the simultaneous use of these is also recommended as a matter of course. FIG. 6 shows an example thereof, wherein a water cooling jacket 35 is provided on the circumference of the high-pressure cylinder 1 to form a cooling water passage 36 with the high-pressure cylinder 1, whereby the high pressure cylinder 1 is constituted as a radiating member. The cooling rate can be more improved by adapting also such a structure to allow the rapid cooling of the workpieces 9. Such a water cooling jacket may be provided on the outer surface of the upper lid 2.

We claim:

1. A hot isostatic pressing apparatus comprising:
   a high-pressure vessel;
   a heater provided within said high-pressure vessel;
   a bottomed cylindrical casing being provided within the high-pressure vessel, said bottomed cylindrical casing comprising a treatment chamber for treating workpieces to be treated formed in the inner part, and being capable of housing said heater;
   a bottomed cylindrical heat insulating structure provided within said high-pressure vessel, said heat insulating structure being provided on the outside of said casing so as to cover said casing;
   a gas flow regulating valve provided for regulating the gas flow surrounding said casing;
   a heat sink having a water cooling mechanism, said heat sink being provided in the space defined by said heat insulating structure and the inner surface of said high-pressure vessel; and
   a pressure medium gas stirring fan, said fan being arranged within said casing to promote the temperature uniformity of the treatment chamber space for housing workpieces; and
   a circulating flow promoting fan positioned for controlling the convection of gas in the space defined by the inner surface of said heat sink and the outer surface of said heat insulating structure to improve the cooling rate.

2. The heat isostatic pressing apparatus according to claim 1, further comprising a header member for distribution the flow of cooling water, wherein said heat sink comprises an arrangement of plural metallic pressure resisting pipes, and said pressure resisting pipes are connected to said header member.

3. The hot isostatic pressing apparatus according to claim 1, further comprising a water cooling mechanism provided so as to make contact with the outer surface of said high-pressure vessel.

4. The hot isostatic pressing apparatus according to claim 1, further comprising temperature sensors provided on the upper part and lower part of the treatment chamber.

5. The hot isostatic pressing apparatus according to claim 1, wherein said pressure medium gas stirring fan is arranged on the lower side within said casing.

6. The hot isostatic pressing apparatus according to claim 1, further comprising a workpiece case provided within said casing, wherein the workpieces to be treated are arranged in said workpiece case.

7. The hot isostatic pressing apparatus according to claim 6, wherein the workpiece case comprises a hole for passing a pressure medium gas in the lower part, and the pressure medium gas stirring fan is arranged under the hole.

8. The hot isostatic pressing apparatus according to claim 1, wherein the circulating flow promoting fan is located in the space defined by the inner surface of said heat sink and the outer surface of said heat insulating structure.

* * * * *